United States Patent
Ho et al.

[11] Patent Number: 4,797,549
[45] Date of Patent: Jan. 10, 1989

[54] OPTICAL SENSOR AND METHOD OF MAKING SAME

[75] Inventors: Thanh Ho, Indianapolis; Gerald T. Fattic, Anderson, both of Ind.

[73] Assignee: General Motors Corporation, Detroit, Mich.

[21] Appl. No.: 118,474

[22] Filed: Nov. 9, 1987

[51] Int. Cl.⁴ .................................................. H01J 5/16
[52] U.S. Cl. ............................. 250/227; 250/231 SE; 350/320
[58] Field of Search ..................... 250/227, 231 SE; 350/96.20, 96.21, 320

[56] References Cited

U.S. PATENT DOCUMENTS

| | | | |
|---|---|---|---|
| 4,215,937 | 8/1980 | Borsuk . | |
| 4,430,566 | 2/1984 | Searle | 250/231 SE |
| 4,474,423 | 10/1984 | Bisbee et al. . | |
| 4,503,326 | 3/1985 | Searle | 250/227 |
| 4,506,947 | 3/1985 | Tatekura et al. . | |
| 4,509,827 | 4/1985 | Cowen et al. . | |
| 4,634,857 | 1/1987 | Fey | 250/227 |
| 4,645,923 | 2/1987 | De Blok et al. | 250/227 |
| 4,664,732 | 5/1987 | Cambell et al. . | |
| 4,682,842 | 7/1987 | Mahlein et al. . | |
| 4,733,933 | 3/1988 | Pikulski | 350/96.20 |

FOREIGN PATENT DOCUMENTS 0121013  7/1984  Japan ................. 350/96.20

*Primary Examiner*—David C. Nelms
*Assistant Examiner*—Jessica Ruoff
*Attorney, Agent, or Firm*—C. R. Meland

[57] ABSTRACT

An optical sensor has a gap for a toothed modulator wheel and accurately aligned optical fibers on either side of the gap. The fibers form a U-shape to allow compact sensor design. The sensor is fabricated by inserting a single optical fiber in a mold and supporting the fiber in a U-shape such that the bottom of the U bend includes a straight portion. A thermosetting material is molded around the fiber to form a body and encapsulsate the fiber. A gap is formed by excluding or removing the resin from the region of the straight portion. A part of the straight portion of the fiber at the gap is removed so that the remaining spaced ends are inherently aligned across the gap.

5 Claims, 3 Drawing Sheets

OPTICAL SENSOR AND METHOD OF MAKING SAME

FIELD OF THE INVENTION

This invention relates to a method of making an optical sensor of the kind requiring axially aligned optical fibers on opposite sides of a gap and to a sensor made by the method.

BACKGROUND OF THE INVENTION

It is often required to produce optical devices having accurately aligned optical fibers. When light is transmitted from one fiber to another a number of conditions can cause large light losses. Poor alignment is a major source of inefficiency. If a pair of fibers are laterally displaced by 10% of the fiber core diameter a 0.5 dB optical power loss will result. Thus, for a fiber having a diameter of 100 micrometers, a misalignment of 10 micrometers will cause a loss of 10% of input power. Similarly, an angular misalignment will also cause significant losses.

It is also required to produce optical sensors which are very compact, requiring curved fiber paths within a small package which also contains a gap between aligned fiber ends to eeceive a toothed wheel or other modulating device. Fabricating such sensors on a mass production basis provides a challenge which is not met by prior art methods.

Several schemes have been proposed for fiber connectors, splices, etc. which allow efficient end-to-end coupling of straight fibers. Some such devices use alignment aids such as V-grooves in support plates to hold straight lengths of fibers in registry. Other devices use a common surface such as a continuous tube to hold both fibers. In general, these techniques are useful when straight fibers are being spliced and the support for the fibers is continuous, but do not apply in sensors where the fibers must be curved or when a substantial gap between the fiber ends is needed.

SUMMARY OF THE INVENTION

It is therefore an object of the invention to provide a method of making an optical sensor which yields accurate fiber alignment of either straight or curved fibers on opposite sides of a gap for a modulation device. The invention also encompasses the sensor made by the method.

The invention is carried out by the method of making an optical sensor with aligned spaced optical fibers comprising the steps of; supporting a fiber optic element in a configuration having a straight portion, encapsulating at least the straight portion of the element in a rigid medium for maintaining the configuration, and forming a gap in the element by removing a segment of the straight portion so that the remaining element portions adjacent the gap are axially aligned.

The invention is further carried out by the sensor made by the above method.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE PREFERRED EMBODIMENT

Figure 1:
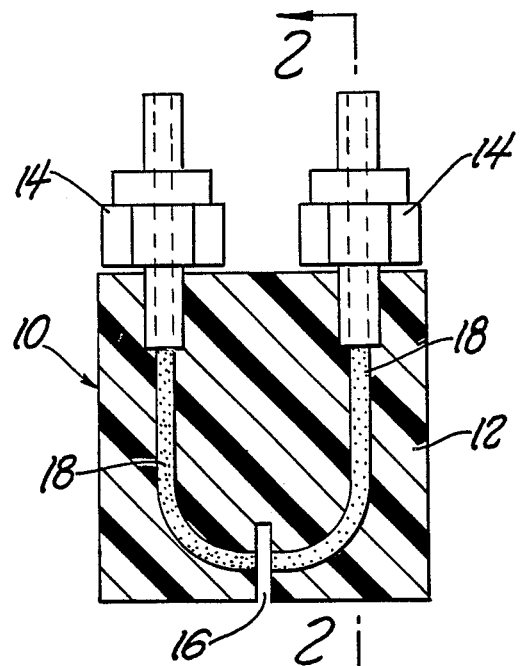
FIG. 1 is a cross-sectional front view of an optical sensor according to the invention.
Figure 2:
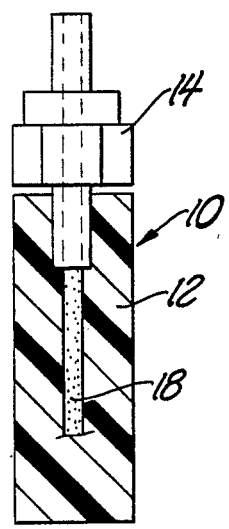
FIG. 2 is a cross-sectional side view of the sensor taken along line 2—2 of FIG. 1.

Referring to the drawings, FIGS. 1 and 2 show an optical sensor 10 made according to the invention. Sensors of this general variety are known to be useful for sensing the position or speed of rotating elements such as vehicle engines, axles or other rotary parts. A toothed wheel or other element driven by the rotating part interacts with light in the sensor to modulate the light, as is well known in the art, thereby giving rise to a signal which may be electrically analyzed to extract speed or position information.

The sensor 10 includes a body 12 molded of a thermosettng resin. The body is essentially square and has a pair of fiber optic connectors 14 mounted on one side for coupling external optic leads to internal fiber optics. A slot or gap 16 in the side of the body opposite the connectors 14 allows a toothed wheel or the like to modulate light transmitted across the gap.

A pair of optical fibers 18 extend through arcuate paths from the connectors 14 to opposite sides of the gap 16 for transmission of light across the gap. The fiber ends at the gap 16 are polished and are precisely aligned axially and angularly to optimize the efficiency of light transmission. A special technique is required to fabricate this precision device, especially where the device is small and the space for bending the fibers 18 is limited.

Figure 3:
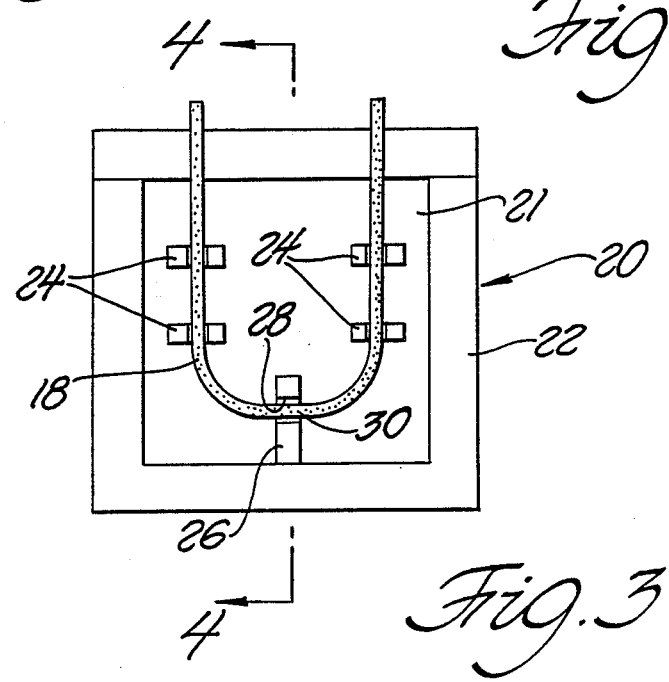
FIG. 3 is a top view of a mold during the first step of fabricating the sensor according to the invention.
Figure 4:
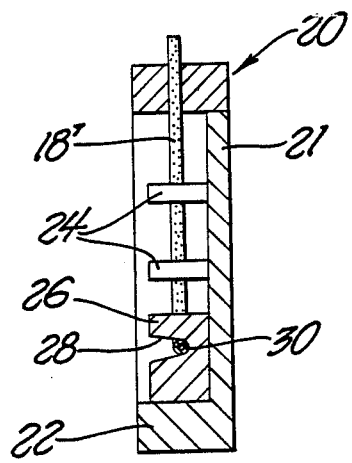
FIG. 4 is a cross-sectional side view of the mold of FIG. 3.

The first step in making the optical sensor is best understood by referring to FIGS. 3 and 4. These figures are simplified by omitting the connectors 14 from the assembly. Obviously the connectors can be included by standard insert molding methods. A mold 20 has a bottom 21 and walls 22 defining a cavity having the size and shape of the sensor body 12, and includes fiber supports 24 and 26 mounted on the mold bottom 21 and arranged to define a U-shaped fiber path. The supports 24 are spaced from the walls 22 and are located along the legs of the U. The support 26 is located at the bottom of the U and is shaped and sized to define the desired slot or gap 16 and abuts the wall 22. Each support has a tapered slot or recess 28 sized to snugly receive a fiber and frictionally secure it at the bottom of the slot 28. The support 26, in particular, has a recess 28 which is straight in the direction of the fiber so that curvature of the fiber at the bottom of the U is prevented.

A single fiber 18' bent into a U-shape has its legs extending through a wall of the mold and is held in each of the supports 24 and 26. The bend of the U occurs on either side of the support 26. Due to the straight recess in the support 26, the specific section 30 of the fiber at the gap 16 is straight and the curvature only begins just beyond the edge of the support. By proper placement of the fiber in the supports the shape of the U can be controlled and the bottom of the U can be made straight even beyond the support 26. Due to the straight section 30 at the bottom of the U, the fiber portions adjacent the support (or adjacent the gap 16) are inherently aligned exactly.

After the fiber 18' is positioned in the mold 20, a liquid thermosetting resin such as epoxy is added to the mold and allowed to harden. To prevent resin from entering the desired slot 16, the recess 28 in the support 26 may be filled by a mold insert or some easily removed material. Otherwise any extraneous resin in the gap region can be removed after hardening.

Figure 5:
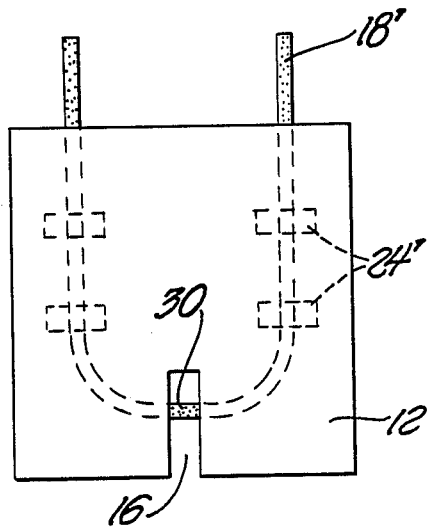
FIG. 5 is a front view of a partially fabricated sensor after removal from the mold of FIG. 4.

When the molded assembly is removed from the mold, as shown in FIG. 5, it will contain the slot 16 as formed by the support 26 and cavities 24' left by the supports 24. The cavities 24' are preferably filled with a resin to protect the fiber 18'. A precise length of the straight section 30 of the fiber 18' which crosses the slot 28 is removed to provide an optical gap thus forming the two optical fibers 18. The removal is accomplished by a cutting tool which enters the slot 28 to cut, abrade or otherwise remove the section 30. A rotary sanding disc can be used so long as clean parallel surfaces remain. Another removal tool is a pair of razor blades mounted on a spacer sized to obtain the right width of cut. Then two cuts are made simultaneously to remove the section 30 and form the gap. To obtain optimal light transmission the cut faces of the fibers should be not only parallel but also perpendicular to the axis of the fibers 18. Further the faces should be polished. The polishing is readily accomplished by dressing the faces with coarse lapping paper having 5 micrometer abrasive and then with a fine lapping paper having 1 micrometer abrasive. To facilitate the polishing step it is helpful to cut the fiber with a small amount projecting into the gap. The resulting product (with connectors 14 added) is the sensor depicted in FIGS. 1 and 2.

A specific sensor made according to the method of the invention has a body 12 one inch square and 0.35 inch thick and made of aluminum liquid epoxy, FSMA connectors 14 from AMP Corp., a gap 16 having a width of 0.050 inch and a multimode plastic fiber. The fiber has a core and cladding diameter of 1 mm and a protective coating or buffer about 0.5 mm thick.

To complete the sensor function a light source and receiver are coupled to the two connectors 14 to supply light to the sensor and to read the light signal produced at the sensor. A modulating device is also necessary to modulate the light signal. This is usually accomplished by a toothed wheel in the gap 16 arranged in the light path to alternately interfere with and pass the light to generate a modulated signal in accordance with wheel position or movement.

Figure 6:
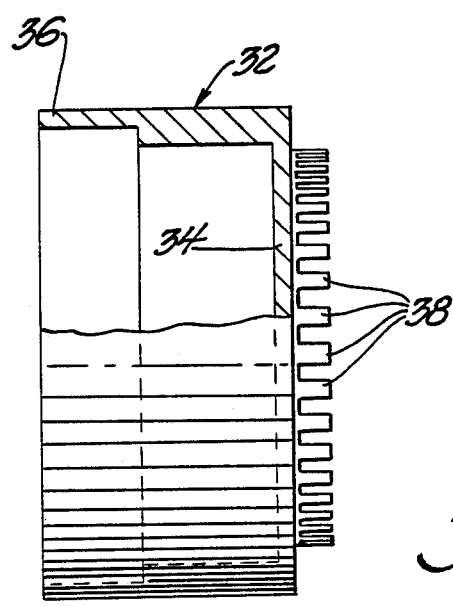
FIG. 6 is a partially sectioned side view of a modulator for use in conjunction with the sensor of FIG. 1.

A particular modulator used with the sensor of FIGS. 1 and 2 is shown in FIG. 6. This modulator 32 comprises a cup portion having a face 34 and a skirt 36 for attachment to a shaft. An annular array 38 of thin teeth on the side of the face 34 opposite the skirt 36 and coaxial with the skirt 36. The array has a diameter of 1.23 inches and the teeth are 0.015 thick so that the arcuate path of the array is readily accommodated in the 0.050 inch gap of the sensor described above.

Figure 7:
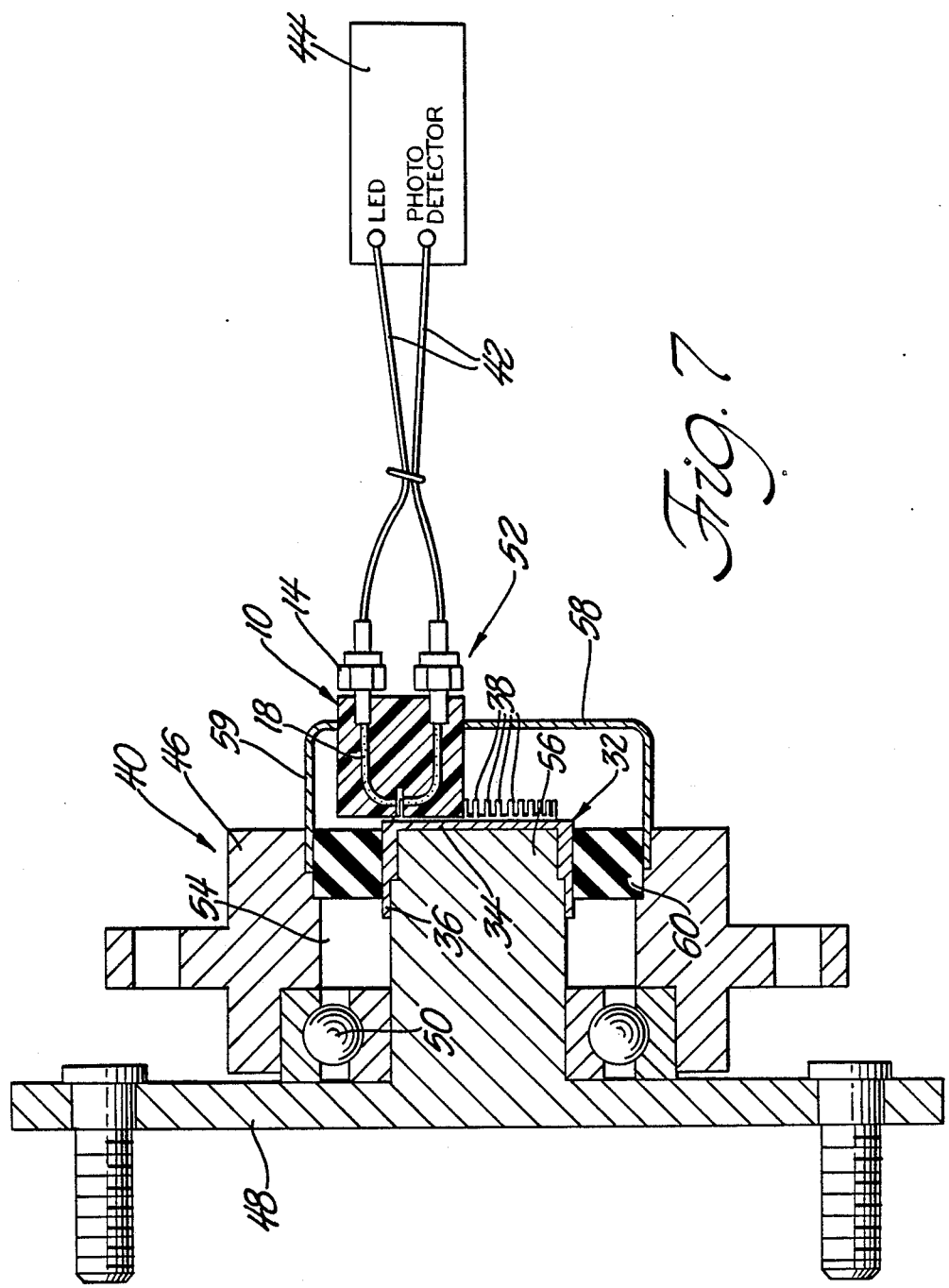
FIG. 7 is a cross-sectional side view of a hub-wheel assembly with the optical sensor of FIG. 1 attached to operate as a wheel speed sensor.

An application of the sensor of the invention is shown in FIG. 7. There the sensor 10 is mounted on an automobile hub-wheel assembly 40 to sense wheel speed. The sensor 10 is coupled by fiber optic leads 42 to a circuit 44 providing a light source, a photodetector and means to analyze the optical signal and to utilize the information. The assembly 40 includes a stationary hub housing 46, a rotating hub housing 48 journaled to the stationary housing 46 by a bearing 50, and a sensor assembly 52. The stationary hub housing 46 has a central bore 54. The rotating hub assembly 48 has a shaft 56 which extends through the bore 54 of the stationary hub housing and which mounts the bearing 50.

The sensor assembly 52 includes a cuplike cover 58 with a skirt 59 which seats in the bore 54 so that the cover extends over the end of the shaft 56 to hold the sensor 10 adjacent the shaft end. The modulator 32 is mounted to the shaft 56 with the modulator skirt 36 fitting around the end of the shaft. The array 38 is received in the gap of the sensor 10 to modulate the optical signal as the shaft turns. The cover 58 also serves to seal out dirt, and to that end is provided with a seal 60 between the skirt 59 of the cover and the skirt 36 of the modulator 32.

It will thus be seen that the sensor is a rugged and compact unit adaptable to varied applications. The method of making it provides an inexpensive manufacturing process with high yields due to the provision for an exact alignment of the optical fibers at the gap in spite of the curvature requirements of a compact design. While the method is especially important where the design requires the fiber curvature so close to the gap, it will also be useful to assure fiber alignment in other designs.

The embodiments of the invention in which an exclusive property or privilege is claimed are defined is follows:

1. The method of making an optical sensor with aligned spaced optical fibers comprising the steps of;
   supporting a fiber optic element in a configuration having a straight portion,
   encapsulating at least the straight portion of the element in a rigid medium for maintaining the configuration, and
   forming a gap in the element by removing a segment of the straight portion so that the remaining element portions adjacent the gap are axially aligned.

2. The method of making an optical sensor with aligned spaced optical fibers comprising the steps of;
   forming a generally U-shaped bend in an optical fiber such that the fiber path has a straight portion in the bend as well as a curved portion,
   supporting the fiber to secure the straight portion,
   molding the U-shaped bend of the fiber in a thermosetting material to maintain the fiber shape, and
   cutting a segment of the fiber element from the straight portion to form a gap with axially aligned fiber optic portions adjacent the gap.

3. The method of making an optical sensor with aligned spaced optical fibers comprising the steps of;
   forming a generally U-shaped bend in an optical fiber such that the fiber path has a straight portion in the bend as well as a curved portion,
   supporting the fiber in a straight recess of a mold to secure the straight portion,
   molding the U-shaped bend of the fiber in a thermosetting resin to maintain the fiber shape,
   exposing the straight portion of the fiber by removing the mold, and
   cutting a segment of the exposed straight portion of the fiber element along spaced planes perpendicular to the fiber axis to form a pair of parallel faces defining a gap with axially aligned fiber optic portions adjacent the gap.

4. The method of making an optical sensor with aligned spaced optical fibers comprising the steps of;

forming a generally U-shaped bend in an optical fiber such that the fiber path has a straight portion in the bend as well as a curved portion, supporting the fiber in a straight recess of a mold to secure the straight portion, molding the U-shaped bend of the fiber in an epoxy material to maintain the fiber shape, exposing the straight portion of the fiber by removing the mold, cutting a segment of the exposed straight portion of the fiber element along spaced planes perpendicular to the fiber axis to form a pair of parallel faces defining a gap with axially aligned fiber optic portions adjacent the gap, and polishing the faces.

5. An optical sensor having a pair of aligned fiber optic elements on opposite sides of a gap, comprising;

a molded thermosetting body having a gap, a pair of fiber optic elements embedded in the molded body on opposite sides of the gap aligned for efficient light transmission across the gap, the formation of the fiber optic elements and the alignment being accomplished during molding of the body by arranging an optical fiber in a mold, supporting the straight portion of the fiber by a mold part to maintain its straightness and to protect the desired gap region of the fiber, encapsulating the fiber in thermosetting material to form the body, exposing the straight portion by removing the mold, and cutting the fiber at spaced parallel planes to remove a segment from the exposed portion to thereby form the gap with the fiber optic elements aligned on either side of the gap.

* * * * *